VALVE SEAL
Filed March 18, 1965
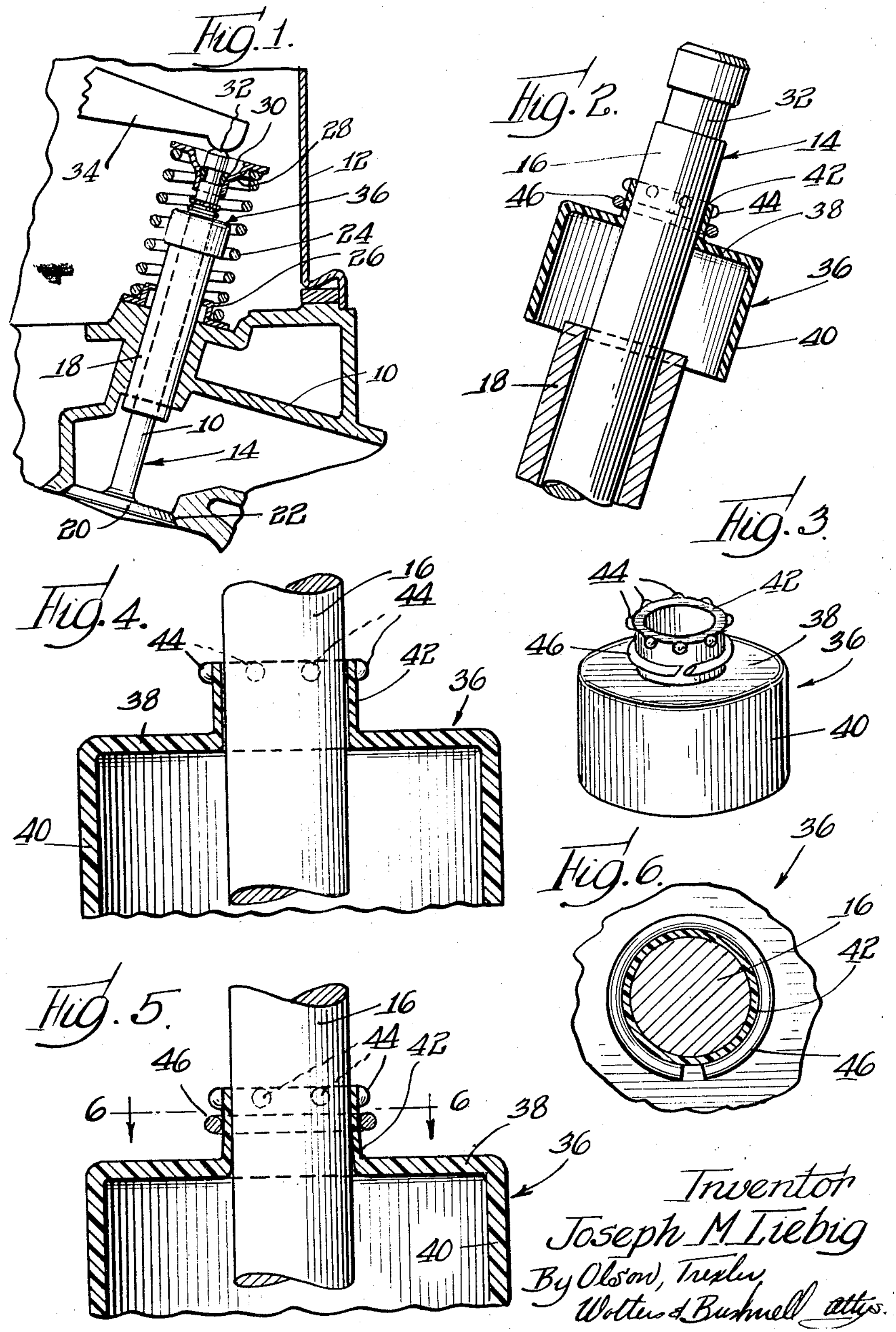

United States Patent Office 3,403,918
Patented Oct. 1, 1968

1

3,403,918
VALVE SEAL

Joseph M. Liebig, Wheaton, Ill., assignor to Illinois Milling, Incorporated, Chicago, Ill., a corporation of Illinois Filed Mar. 18, 1965, Ser. No. 440,899
7 Claims. (Cl. 277—152)

This invention relates to an improved valve stem seal particularly for an automotive engine.

In gasoline engines, as commonly used in automobiles and the like, there are two valves for each cylinder. These valves reciprocate at proper times to allow a combustion charge to be drawn in and fired, and the burned gases to be exhausted. Rather considerable vacuum is developed in a cylinder on an intake stroke of a corresponding piston, and there is thus a tendency to pull oil into the combustion chamber along the valve stem, between the valve stem and guide. It is undesirable to allow any substantial amount of oil to pass into the combustion chamber, since it results in high oil consumption, and further causes a smoky exhaust, and may ultimately be expected to result in harmful deposits in the combustion chamber. Typically, such deposits tends to build up between the valve and the valve seat, thus preventing the valve from closing properly, and leading in turn to burning of the valve and malfunction of the engine.

In modern overhead valve type engines, it has become fairly common practice to provide a valve seal somewhat in the nature of a skirt or umbrella which is resiliently fixed in place on the valve stem, and which rides up and down with it, shielding the top of the valve stem guide against splashing oil. This valve stem seal is commonly made of rubber, and as exemplary of the prior art, Smith et al. U.S. Patent 2,698,012 may be considered.

Such valve seals have in time hardened and lost their elasticity. They have loosened on the valve stem and have simply rested on top of the valve guide without serving their intended function. In many instances, the seal actually cracks and breaks apart and becomes completely useless.

To avoid the difficulties of the prior art valve seals, I have disclosed and claimed in my copending application entitled, "Valve Seal," filed on Jan. 26, 1965, under Ser. No. 428,080, an improved valve seal comprised of a synthetic resin with an elastomeric insert to grip the valve stem.

It is an object of the present invention to provide an improved valve stem seal made entirely of inexpensive molded plastic.

More particularly, it is an object of this invention to provide such a plastic valve seal held in place by a metallic fastening member.

Specifically, it is an object of this invention to provide a plastic valve stem seal held in place by a split-ring wire washer.

Other and further objects and advantages of the present invention will be apparent from the following description when taken in connection with the accompanying drawings wherein:

FIG. 1 is a fragmentary view in vertical section through the head of an overhead valve internal combustion engine showing a valve and related parts;

FIG. 2 is an enlarged fragmentary view showing a portion of the valve stem, seal and guide;

FIG. 3 is a perspective view of the valve seal as constructed in accordance with the present invention;

FIG. 4 is a further enlarged axial sectional view through the valve seal and the accompanying valve stem upon initial positioning of the valve seal on the stem;

FIG. 5 is a view similar to FIG. 4 and showing the split ring wire washer on the valve seal; and

2

FIG. 6 is a cross-sectional view taken substantially along the line 6—6 in FIG. 5.

Referring now in greater particularity to the drawings, and first to FIG. 1, there will be seen the usual head 10 of an automotive engine of conventional construction, and having a valve lifter cover or rocker arm cover 12 secured thereto in any known or suitable manner. The usual poppet valve 14 is provided, having a stem 16 reciprocable in a guide 18 fixed in the head, and further having a valve head 20 seating against a seat 22 formed in the head, either integrally or as an insert. The valve stem is surrounded by a compression helical spring 24 bearing at the bottom against a bushing or spring locator 26 centered about the valve stem guide 18 and bearing against a fixed part of the head. The spring bears at the top against the usual spring retainer 28 held in place by the usual valve spring retaining locks 30 received in an annular groove 32 adjacent the upper end of the valve stem. One end of a rocker arm 34 bears against the upper end of the valve stem for periodically opening a valve as the rocker arm is pivoted by a valve lifter (not shown).

In addition, and as seen particularly in FIGS. 2–6, a valve seal 36 is provided on the valve stem 16 of the valve guide 18. The valve seal is of an inverted cup-shape construction comprising a disc or washer-like body 38 and an integral depending skirt 40. The skirt is shown as being cylindrical, but could flare slightly outwardly. The body, as well as the skirt, is made of a molded plastic material which will stand up to 300 degrees fahrenheit temperature without losing its form and shape. Nylon is one satisfactory material which is well known and which is available at an economical price, although there are many other plastic materials which are satisfactory. As will be observed particularly in FIGS. 4 and 5, the body 38 and skirt 40 are of substantially uniform thickness and are disposed at right angles to one another. In addition, there is an upstanding tubular stem or neck 42 which surrounds the valve stem, and which forms a sufficiently loose fit thereof as to allow ready installation of the seal over the valve stem. The tubular sleeve stem or neck 42 is of less thickness than the remainder of the valve seal, since a certain amount of flexibility is necessary in this stem or neck, whereas there is desirably a certain amount of rigidity to the body and skirt. The tubular sleeve or stem 42 is provided at its upper outer edge with a plurality of arcuately spaced nibs or protuberances 44.

The valve stem 16 becomes quite hot in operation, and this is true also of the sleeve 42 and adjacent part of the body 38. Thus, although the seal may initially form a sufficiently tight fit with the stem 16 and have sufficient resilience to grip the stem, it is to be anticipated that in use the seal will tend to loosen its grip, in-so-far as it has been described heretofore. To prevent such loosening, a split ring wire washer 46 to provided about the sleeve 42, tightly gripping the sleeve against the valve stem 16, as seen in FIG. 5, and preventing undesired movement of the seal relative to the stem.

Although the valve seal is shown in FIG. 4 without the split ring wire washer 46 in place, it will be understood that it is normal practice to preassemble the wire washer with the valve seal. As will be apparent, the upstanding hollow sleeve 42 has a central bore of substantially the same internal diameter as the valve stem 16 and the bore extends down through the seal body 38. The seal 36 is assembled with the valve stem before the spring and associated parts are assembled therewith, but after placement of the bushing or spring locator 26 about the valve stem guide, and after assembly of the valve with the guide. The seal is initially disposed relatively adjacent to the guide 18, and the first time the valve is moved to open position the seal abuts the top of the guide 18, and is relatively moved up on the stem to its permanent position.

It will be appreciated that the wire split ring retainer 46 firmly retains the valve seal in position even though the plastic material may somewhat lose its elasticity with heat. Such split ring retainers are widely available in commerce at a low price, and the cost of the plastic molded seal also is low. The total cost of the seal is no higher than that of competing rubber seals, and generally is somewhat less; yet it does not suffer from the deficiencies of the prior art rubber seals.

The specific example of the invention as herein shown and described is for illustrative purposes. Various changes in structure will no doubt occur to those skilled in the art and will be understood as forming a part of the present invention in-so-far as they fall within a spirit and scope of the appended claims.

The invention is claimed as follows:

1. A valve seal for mounting on the stem of a valve of an internal combustion engine comprising a substantially cup-shaped member having an axial aperture therethrough and having a tubular neck extending axially therefrom, and a resilient member encircling said neck for compressing said neck against a valve stem to fixedly interconnect the valve seal and valve stem.

2. A valve seal for mounting on the stem of a valve of an internal combustion engine comprising a substantially cup-shaped body having an axial aperture therethrough and having an integral flexible tubular stem extending therefrom, and a resilient gripping member externally encircling said hollow stem for gripping said hollow stem against a valve stem to fixedly mount the valve seal on the valve stem for movement relative to a head of the engine.

3. A valve seal as set forth in claim 2 wherein the valve seal is constructed of resinous plastic.

4. A valve seal as set forth in claim 2 wherein the gripping member comprises a split ring resilient wire ring.

5. A valve seal for mounting on the stem of a valve of an internal combustion engine comprising a cup-shaped member having a disc-like body and an integral depending skirt, said disc-like body and skirt being of substantial uniform thickness, said body having an aperture therethrough and an upstanding tubular sleeve integral with said body and encircling said aperture for receipt of a valve stem, and gripping means encircling said sleeve for gripping said sleeve against a valve stem to fixedly mount the valve seal on the valve stem.

6. A valve seal as set forth in claim 5 wherein the sleeve is integral with said body and of lesser thickness than said body to impart improved flexibility thereto.

7. A valve seal as set forth in claim 5 and further including radial protuberance means outstanding from said sleeve at a position thereon remote from said body to prevent said gripping means from moving off of said sleeve.

References Cited

UNITED STATES PATENTS

| | | | |
|---|---|---|---|
| 2,843,102 | 7/1958 | Duesenberg | 123—188 |
| 2,906,255 | 9/1959 | Bunce | 123—188 |
| 3,198,188 | 10/1965 | Heid | 277—33 X |

SAMUEL ROTHBERG, *Primary Examiner.*